W. H. KLOCKE.
NUT LOCK.
APPLICATION FILED JUNE 8, 1920.

1,394,741. Patented Oct. 25, 1921.

Inventor
William Klocke
By his Attorney
Jas. H. Griffin

UNITED STATES PATENT OFFICE.

WILLIAM H. KLOCKE, OF WOODHAVEN, NEW YORK, ASSIGNOR OF ONE-HALF TO HARRY F. HUGHES, OF BROOKLYN, NEW YORK.

NUT-LOCK.

1,394,741.  Specification of Letters Patent.  Patented Oct. 25, 1921.

Application filed June 8, 1920. Serial No. 387,297.

*To all whom it may concern:*

Be it known that I, WILLIAM H. KLOCKE, a citizen of the United States, residing at Woodhaven, L. I., county of Queens and State of New York, have invented a certain new and useful Improved Nut-Lock, of which the following is a specification.

This invention relates to nut locks and is an improvement on the nut lock of my copending application, Serial No. 361,802, filed Feb. 27th, 1920.

The object of the present invention is to simplify the construction and enable the use of standard nuts, thereby dispensing with the necessity of a special nut.

In automobile construction, wherein this invention is particularly adapted for use, there are many parts of the car which are highly inaccessible and which necessitate the greatest care and expenditure of considerable time during assemblage. This is especially true of the connections between the frame and the chassis, which consists of bolts passing through the respective parts and having nuts at the under sides with which must be associated lock washers in order to preclude the loosening of the frame due to vibration of the car. These nuts are so inaccessible that under the present practice, it is impossible for a single man to put in any one bolt. In large automobile factories, hundreds of men are employed to hold nuts and their associated lock washers in position so that when a bolt is thrust through the frame and chassis, the nut and lock washer may be held in alinement with the hole so that the bolt may be screwed home. These men, who are helpers, lie on their backs on the floor and reach up to hold the lock washers and nuts in position, so that a workman may manipulate the bolt into position. The greatest care must be taken to aline the bolt and lock washer with the hole in the chassis and as the nuts and lock washers are now handled separately, much time is lost in the slipping of the washers during the alining operation.

With these features in mind, the object of the present invention, from a more specific standpoint, is to provide a construction wherein the lock washer and nut may be handled as a unit and are automatically maintained in alinement with one another so that the person inserting a bolt may reach under very readily, and without care, bring the bolt into coöperation with the nut and lock washer, thereby dispensing with the need of a helper.

A further object of this invention is to so associate the lock washer with the nut as not to interfere with the standard dimensions of the latter, since the sizes of nuts are scaled in accordance with the specifications of the Bureau of Standards and wrenches are manufactured in accordance with such sizes. Accordingly, any arrangement of parts which would effect a change in the size of the nut would render impossible the use of standard wrenches, and, accordingly, the present invention is worked out in such manner as to obviate this difficulty and enable standard wrenches to be used with nuts with which the invention is associated.

Features of the invention, other than those adverted, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 6:
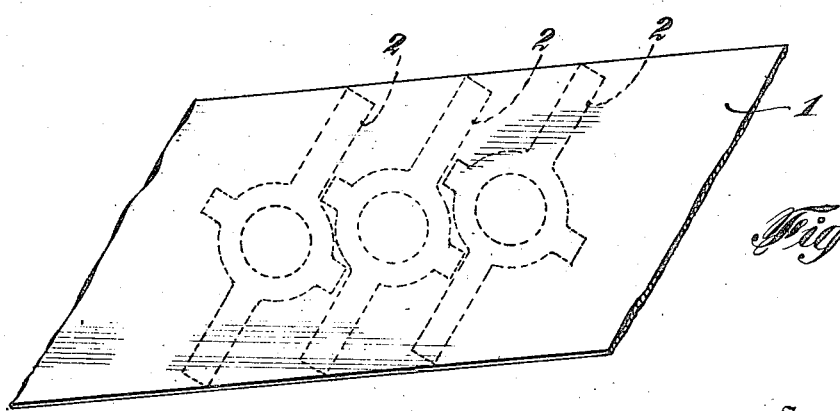

In carrying out the present invention in a practical way, a strip of sheet metal 1 is run through a press and a number of blanks 2 stamped out as shown in dotted lines in Fig. 6. These blanks may be thus stamped out in a simple, convenient and economical manner, each constituting a base washer 3 having two relatively long diametrically oppositely extending arms or tongues 4 and two shorter lateral projecting fingers 5. The base washer 3 has an outer diameter substantially equal to that of the spring washer 6 adapted to be associated therewith and the spring washer is proportioned to correspond with a nut 7, to which it is to be secured.

Figure 3:
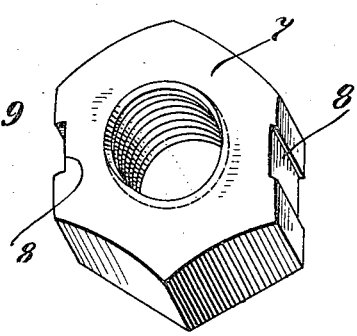
Fig. 3 shows a nut prior to the association of the present invention therewith.
Figure 4:
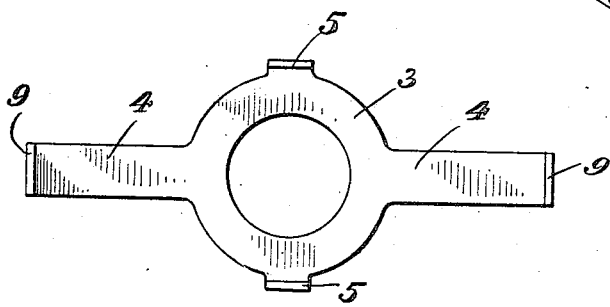
Figs. 4 and 5 show a base washer constructed in accordance with this invention; and, Fig. 6 shows the manner in which the base washers may be economically and conveniently manufactured.
Figure 5:
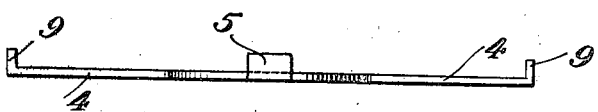

The nut 7 is of the standard, conventional form, shape and size and is adapted for use with the present invention by passing the same through a broaching machine which forms channels 8 in two opposite faces of the nut, as best shown in Fig. 3. These channels are substantially equal in width to the width of the arms 4 of the base washer and are in depth substantially equal to the thickness of the material from which such base washers are stamped.

Figure 1:
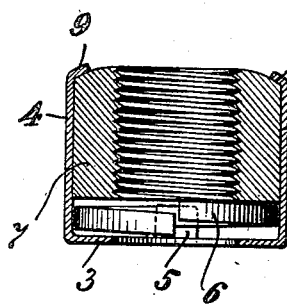
Figure 1 is a central section of a nut with which the present invention is associated.
Figure 2:
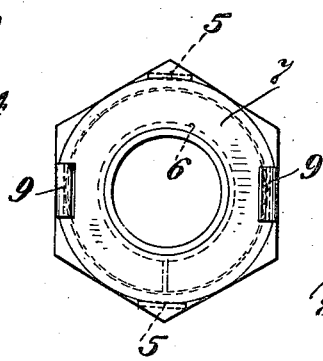
Fig. 2 is a plan view of the structure shown in Fig. 1.

The parts of the construction having been produced in the manner described are ready for assembly and this is accomplished by positioning the base washer 3 in alinement with a nut and with the spring washer 6 between the base washer and the nut and then, by suitable machinery bending the arms 4 and the fingers 5 at right angles to the base washer so as to cause the arms 4 to project upwardly and occupy the channels 8, while the projections 5 project upwardly and partake of a position laterally of the spring washer 6. During this operation, the free ends of the arms 4 are bent in over the top of the nut as shown in Figs. 1 and 2, and form flanges 9 which preclude the base washer from movement in a direction away from the nut. The bent up fingers 5 coact with the arms 4 to form a cage for the spring washer 6 and maintain the same in alinement with the nut, while the arms 4 lock the three parts together, so that they may be handled as a unit without fear of separation.

It will be noted that, since the arms 4 occupy the channels 8 of the nut, the size of the nut is not enlarged and standard wrenches may be used in conjunction therewith, such as would not be the case if the arms reached over the faces of the nut and were not housed in channels. The assemblage of the kind described may be conveniently manipulated in position to receive a bolt without the exercise of any care as to the position of the lock washer. There is no tendency whatsoever to lose the washer, since it is automatically maintained in cooperative relation to the nut. By the use of the assemblage of this invention, manually operated magnetic wrenches, such as are frequently used in other connections, may be employed by the operator, who inserts the bolt, thereby entirely dispensing with the necessity of a helper for carrying out the operations described.

It will be understood that the specific invention described may be modified in formal respects, such as by the substitution of equivalents, and that parts of the complete mechanism described may be used alone, or in other environments, without departing from the spirit or substance of the broad invention, the scope of which is commensurate with the appended claims.

Having thus fully described the invention, what I claim as new and desire to secure by Letters Patent is:

1. An assemblage of the class described embodying a nut provided on a plurality of its faces with grooves or channels, a spring lock washer positioned adjacent the base of the nut and a base washer positioned adjacent the distant face of the lock washer, in combination with a plurality of arms bent in the direction of the nut and flanged over the distant face thereof, said arms occupying the channels or grooves in the faces of the nut, and a plurality of fingers associated with the base washer and extending in a direction of the lock washer and overlying the outer circumference thereof, said fingers coöperating with the arms to maintain the lock washer and nut in associated alined relation.

2. An assemblage of the class described embodying a nut, a lock washer positioned back of the nut and in alinement therewith, and means for securing the lock washer to the nut, said means coöperating with the side of the nut opposite to that adjacent the lock washer and passing from said side into coöperative relation with the lock washer through channels formed in the faces of the nut, whereby said means does not interfere with the standardized size of the nut.

3. An assemblage of the class described embodying a nut, a lock washer and a base washer positioned in alinement with the lock washer between the nut and the base washer, and arms formed integral with the base washer and extending past the lock washer and through channels formed in the faces of the nut, the free ends of said arms being bent over the top of the nut for the purpose of maintaining the parts assembled, without interfering with the standardized size of the nut, whereby the assemblage may be handled as a unit with standard wrenches.

4. An assemblage of the class described embodying a nut, a lock washer and an annular base washer positioned in alinement with the lock washer between the base of the nut and the base washer and in contact with both the nut and base washer, and arms formed integral with the base washer and extending from the outer periphery thereof upwardly past the lock washer and through channels formed in the faces of the nut and of sufficient depth to completely receive the arms, the free ends of said arms being bent over the top of the nut for the purpose of maintaining the parts assembled without interfering with the standardized size of the nut, whereby the assemblage may be handled as a unit with standard wrenches.

In testimony whereof, I have signed my name to this specification.

WILLIAM H. KLOCKE.